United States Patent

[11] 3,599,228

| [72] | Inventors | Charles E. Coco<br>Temple;<br>Stanley M. Welsh, Reading, both of, Pa. |
|---|---|---|
| [21] | Appl. No. | 796,434 |
| [22] | Filed | Feb. 4, 1969 |
| [45] | Patented | Aug. 10, 1971 |
| [73] | Assignee | Wyomissing Corporation |

[54] THERMAL RECORDER
5 Claims, 9 Drawing Figs.

[52] U.S. Cl. .................................. 346/76,
346/135, 340/166
[51] Int. Cl. .................................. G01d 15/10
[50] Field of Search .................................. 346/76,
135; 340/166, 174 TF; 219/216

[56] References Cited
UNITED STATES PATENTS
2,686,222  8/1954  Walker et al. .................. 340/166 X
3,161,457  12/1964  Schroeder et al. .................. 346/76
3,312,979  4/1967  Della Torre et al. .................. 346/76

Primary Examiner—Joseph W. Hartary
Attorney—Synnestvedt and Lechner

ABSTRACT: A system is provided to convert electrically coded intelligence into a visual display of such intelligence. In a preferred form of the invention, a sheet of material carrying a thermally responsive coating material is provided with a plurality of closely spaced electrical junctions. The junctions include a resistive component that causes heat to be generated when current passes through the junctions. This heat is used to develop a visual image on the thermally reactive paper.

In the preferred practice of this invention, the junctions are defined by a first series of linear conductors located in a first plane, a second series of linear conductors angularly disposed with respect to the first conductors located in a second plane, and a resistive element in the form of a continuous film or coating separating the first and second conductors.

PATENTED AUG 10 1971 3,599,228

INVENTORS
CHARLES E. COCO
STANLEY M. WELSH
BY Synnestvedt & Lechner
ATTORNEYS

INVENTORS
CHARLES E. COCO
STANLEY M. WELSH
BY Synnestvedt & Lechner
ATTORNEY

THERMAL RECORDER

BACKGROUND OF THE INVENTION

1. Field of the Invention

This invention relates to methods and means for recording information on a sheet of material by electrical and chemical means. More particularly, this invention relates to methods for displaying information by means of a system that is comprised of an electrically responsive coordinate system arranged to display intelligence variously in written, printed or pictorial form, on a substrate such as a sheet of paper.

2. Description of the Prior Art

In man's quest to record information and communicate with others, many mechanical devices have been designed to reduce the burden of recording or displaying information by handwritten script. Typewriters commonly are used to reproduce documents if only a few copies are desired, and printing presses may be utilized to produce unlimited copies of a desired work. In more recent times, office copying equipment has become available that will provide limited copies of documents as by thermal or xerographic reproduction means.

More recently, in the present electronic age, it has become necessary for man to receive intelligence from computers. At this point, the limitations of existing means to record and display information became painfully clear. The typewriters, printing presses and duplicating equipment suddenly became antiquated when compared to the fantastic pace set by computers. Not only are these methods slow, but, in the case of printing and typewriting equipment, considerable training and skill is required to obtain minimum levels of efficiency.

Consider that the computer's speed in processing and recalling data from its memory unit has, within the last decade, been reduced to times measured in nanoseconds. When this is compared with human capabilities in recording and retrieving information, for example, 10 or 12 characters per second by the fastest typist, it can be appreciated that the differences between man and machine can be measured by many, many orders of magnitude. For that matter, even the fastest automatic typewriters or teleprinting devices are capable of recording only 15 to 20 characters per second.

For this reason, in many instances, it has proved somewhat impractical to obtain information from computers by any form of direct communication. Because of the tremendous speed mismatch, it is customary to talk to the computer only during an emergency, as when a response from a person is absolutely necessary for the computer to continue operating. In this situation, the computer must wait for a decision, and while it stands idle for only a matter of a few seconds, thousands upon thousands of computations could have been made while it was waiting for the operator to reach a decision.

Due to this speed mismatch, it is conventional to talk to a computer, or have it talk to us, by some indirect means of communication. With regard to receiving information from the computer, with which this invention is concerned, information produced in the computer can be stored in an intermediate medium and then reproduced for slow assimilation by people at a later time so that the computer is not held up. The information that is stored on the intermediate medium may be presented in useful form by character-by-character printing devices such as typewriters, or by printout devices that are capable of printing whole lines at a time. While the very sophisticated of these latter devices reach what seems to be fantastic rates, sometimes exceeding several thousand lines per minute, they are still incredibly slow as compared with the output capacity of the computer.

The printing devices for computer-human communication are further limited in that they can record intelligence essentially only in alphanumeric characters. If a geometric output is desired, it is common to obtain a presentation on a cathode ray tube. This device may also be used to display alphanumeric characters, but its use is somewhat limited in that it does not provide a permanent record, and the quantity of information that it reproduces is limited to that which can be displayed on a single screen at any given time.

OBJECTS OF THE INVENTION

Accordingly, it is an object of this invention to provide improved methods and means for rapidly presenting a visual display of various intelligence.

Another object of this invention is to provide inexpensive methods and means that may rapidly present a visual display of various intelligence in any form, be it written, typed, printed, or of an artistic or geometric design.

Another object of this invention is to provide rapid and inexpensive means whereby information, including pictures and geometric forms, can readily be transmitted by electrical means and developed in the form of a visual presentation at the receiving station.

Another object of this invention is to provide improved methods and means to convert the electrical output of a computer into a visual display of intelligence.

Another object of this invention is to provide methods and apparatus for reproducing documents at almost instantaneous rates.

Another object of this invention is to provide methods and means for electrically recording information as may be used, for example in continuous recording instrumentation.

These and other objects of this invention are achieved by providing a coordinate system comprised of conductive elements that define a plurality of electrical junctions of a give ohmic resistance. The conductive elements are printed on or given functionally related to a substrate, such as of paper, that incorporates a thermally reactive material. When current is selectively passed through a given junction, the heat that is generated is utilized to develop a visual image on the thermally reactive material adjacent such junction.

DESCRIPTION OF THE DRAWINGS

With reference to FIG. 1, there is generally shown a sheet of material 11 having mounted thereon a series of linear conductive elements 12-12. Associated with each of the conductive elements 12-12 is an electrical terminal 13-13, overlying the conductors 12-12 is a layer 14. Adhered to the upper surface of the layer 14 are a series of second linear conductive elements 16-16 arranged at right angles to the first conductive elements 12-12. Each of the conductive elements 16-16 has attached thereto terminal 17-17 on either end. As will be explained in more detail below, the film 14 is electrically conductive but has a resistivity considerably higher than either the first or second conductive elements.

Figure 2:
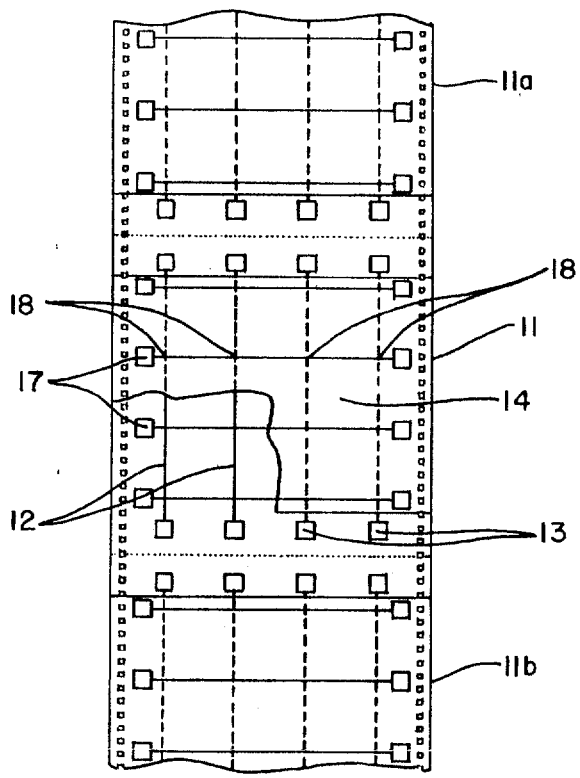
FIG. 2 is a view in plan of a series of recording devices shown in FIG. 1.

As can best be seen in FIG. 2, the projection of the conductive elements 12-12 and 16-16 onto a single plane parallel to the plane of the sheet of material 11 establishes a series of intersections, herein referred to as junctions 18-18. For convenience of description here and in the claims, these junctions are sometimes defined as resulting from the intersection of the two series of conductive elements, although it will be understood that the conductors do not actually intersect except as projected onto a common plane.

Figure 1:
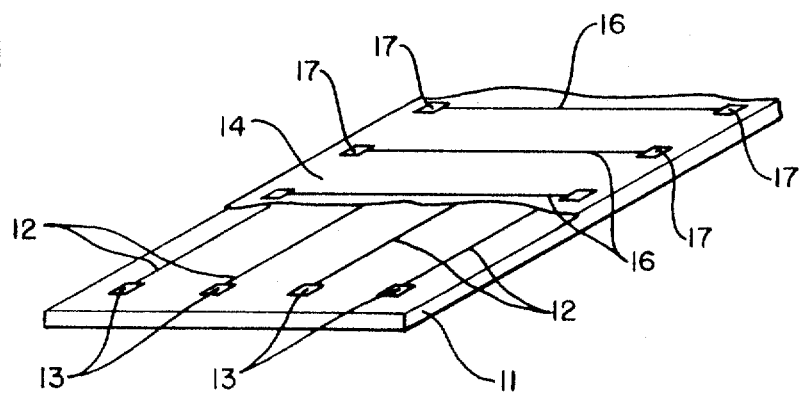
FIG. 1 is a highly schematic perspective view, partially cut away, of a recording device constructed in accordance with this invention.
Figure 3:
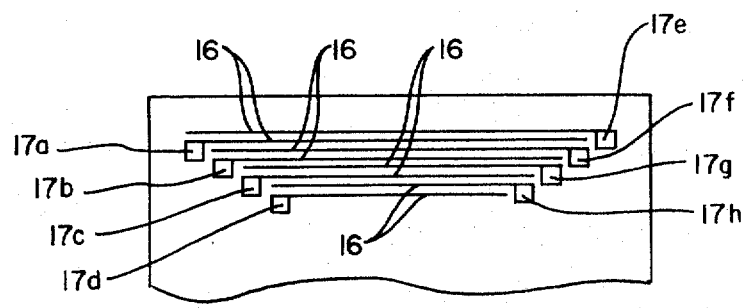
FIG. 3 is a plan view of a portion of a recording device illustrating means for attaching electrical terminals.

As shown in FIGS. 1 and 2, the series of conductive elements 16-16 are illustrated as having electrical terminals 17-17 on both margins of the sheet. Actually, this is not required, and the preferred embodiment for locating these terminals is shown in FIG. 3. Here a series of conductive elements 16–16 are connected on only one of their ends with a terminal 17. Four terminals 17–17 are shown in each margin of the sheet and alternating conductor 16–16 connect to terminals on the opposite side of the sheet. As will readily be apparent in considering FIG. 3, this arrangement allows for providing terminals of somewhat larger size, even though the conductive elements 16–16 are closely spaced with relationship to each other.

From the above description, it can be understood that by electrically energizing a first conductor 12 and a second conductor 16, current will be caused to flow through the resistive film at their junction. This flow of current, due to the resistance of the resistive film 14, will produce heat that, in turn, can be utilized to develop an image.

Various means are known to those skilled in the art by which thermal energy may be converted into a visual image. For example, the sheet of material 11 may be treated with a heat-sensitive material, such as is used in thermal reproduction devices, so that the area proximate the junction is darkened by the heat generated through the flow of current through the junction.

It is also possible to provide chromatic changes at the junctions by including heat-sensitive materials that either will react or decompose due to the momentary current flow at the junction to produce a change in color. If full color reproduction is desired, the junctions can be programmed in sets of three in which each set contains three different materials that are capable of reacting to form the process colors. If the junctions are spaced closely to each other, the process colors will yield high fidelity color reproduction.

Another method for obtaining full-color reproduction is to include a mixture of heat-sensitive materials that will react or decompose to form different colors at different threshold temperatures. Thus, by varying the imposed voltage or time across any given junction, different colors can be developed.

Figure 4:
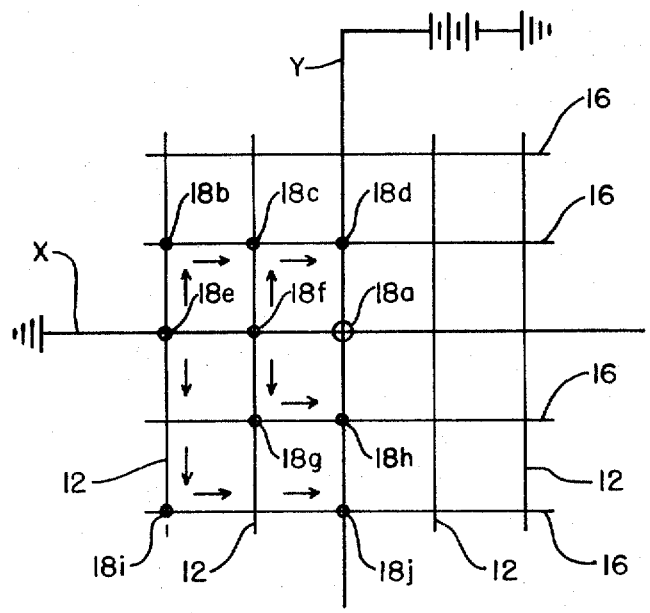
FIG. 4 is a schematic view in plan of several selected junctions of a recording device illustrating certain current flow through the junctions.

Referring to FIG. 4, the operation of the device of this invention can be better explained. Here is illustrated, in greatly magnified and schematic form, a series of horizontally disposed conductive elements 16–16 that overlie a series of horizontally disposed conductive elements 12–12. One of the conductive elements 12, designated "Y," is attached to a grounded source of voltage, and one of the conductive elements 16, designated "X," is connected to ground. The conductive elements X and Y intersect to form a junction 18a having an ohmic resistance of $r$. Similarly, all other intersection conductive elements 16–16 with conductive elements 12–12 have the same resistive value due to the nature of the layer or film 14 separating the different conductive elements. When a voltage is imposed upon conductive elements X and Y, current flows through the junction 18a and the heat generated causes a darkening or color formation at that point.

Note that certain other alternative routes are illustrated by which current will be conducted when conductive elements X and Y are energized. For example, one possible circuit is through junctions 18f, 18c and 18d. Another possible path is through junctions 18f, 18g and 18h. Another possibility is illustrated by junctions 18e, 18i and 18j. Still another possible route is through junctions 18e, 18b and 18d, and so on and so on. However, even though some current will pass through these junctions, the total resistance to the passage of current through any of these routes must be at least three times the resistance at junction 18a and therefore no more than ⅓ of the current flowing through 18a can flow through any other junction and only ⅓ of the heat generated at 18a will be generated at these other junctions. By properly selecting the threshold at which the thermally reactive material becomes effective to yield a visible display, a display will be obtained only at junction 18a where the resistance is sufficiently small to permit the passage of the necessary current to provide the required heat.

For descriptive purposes, the conductive element Y of FIG. 4 is depicted as being connected to a constant source of e.m.f. and the conductive element X connected to ground. In actual practice, the constant source of e.m.f. may be replaced with a high frequency signal source supplemented by means to selectively connect output signals therefrom to the conductive member Y. The grounded connection of conductive element X may otherwise be replaced by a suitable signal generating source with means being provided to selectively energize the conductive element X. The actual means and technique for effecting coincident energization at any one or more of the junctions defined by the intersecting conductive elements is well known in the art and need not be further elaborated upon here.

From the foregoing, it can also be understood that the conductivity of the conductive lines 12–12 and 16–16 must be considerably greater, that is, of lower ohmic resistance, than the junctions 18–18. If it were otherwise, undue heat would be developed as the current passed through the conductive elements and thus give erroneous visual presentations.

It is well within the skill of the art to appreciate that the output of a computer can be programmed in terms of coordinates that will cause electrical impulses to be sent to a sheet of material and cause current to be conducted through selected junction to provide a desired visual display.

It will be readily apparent that the device of this invention will also find utility as a copying device, either for reproducing multiple copies of a document or for transmitting copies of a document to a remote station. Once the necessary intelligence has been recorded in some memory device, it can be retrieved in the form of electrical impulses coded upon a coordinate system that will develop the desired image on the device of this invention.

Still another application that can be made of this recording sheet is in continuously gathering data as from recording instruments. For example, continuous reading thermometers used in scientific or process control endeavors can continuously be plotted on sheets of this sort by a voltage representing an increment of time along one axis and a voltage corresponding to temperature along another axis. By such means, the mechanical difficulties normally encountered with a stylus and other marking devices are avoided.

With reference to FIG. 2, a continuous series of sheets 11–11 is illustrated. Note that each sheet contains its own group of conductive elements as well as its own electrical contacts 13–13 and 17–17. These sheets are meant to be handled in a continuous manner as by feeding them into a device that momentarily makes contact with a conductive element on a given sheet. By scanning the contactors 13–13 and 17–17, preferably by electronic means, information can be recorded almost instantaneously onto a given sheet of material. After this is done, a continuous web is advanced and the next sheet positioned to make electrical contact with the various electrodes. Movable contact devices that may be slid or rotated into electrical connection with the contactors 13–13 and 17–17 may be used.

Essentially, as described hereinabove, the invention differs from the prior art in its preferred embodiment in that it embodies entirely with the article of the invention the means required to generate an image of information to be recorded thereon. Further, it does this in such a manner that a higher degree of resolution is obtained compared to that available through conventional techniques. Since the paper is essentially used only a single time and is a disposable item, damage or wear to the junctions during recording of information becomes of no consequence as compared with other devices that require constant use and reuse of the same electrical contacting elements.

As illustrated in the drawings, both sets of conductive elements are shown as being printed on the same side of a sheet of paper and separated by a resistive film. Since, in the preferred practice of this invention, the conductive lines are comprised of a substantially opaque material, it can be understood that the color-forming layer must be located either on top of the conductive elements or on the reverse side of the paper. This would not be true in the more exceptional circumstance in which the conductive elements were made of transparent materials.

Other arrangements may be suggested. For example, the conductive elements may be printed on opposite sides of a sheet of paper. In this case, the paper may act, in whole or in part, as the resistive layer and the color-forming layer will be located on top of one set of elements. If desired, both sets of elements can be coated with the color-forming layer to provide a direct reading visual image on one side and a mirror image on the other side.

By yet another arrangement, a single set of conductive lines can be laid down on the paper and the visual image developed by placing the paper in close proximity to an external series of intersecting conductive elements, such as may be attached to an endless belt, to provide the necessary electrical junctions. Again, in this instance, the color-forming layer can be located either over the single set of conductive lines or on the reverse side of the paper.

In somewhat more detail, the various elements of the device of this invention are discussed separately below.

1. The Substrate

In the preferred embodiment of this invention, the substrate is made of paper. Paper is advantageous in that it is inexpensive, lightweight, flexible, and easily handled and stored. There is nothing critical in the selection of the paper, other than, of course, it must be a dielectric or have a sufficiently high electrical resistance to prevent the series of lines 12-12 printed on the surface of the paper from shorting out when an e.m.f. is imposed. Also, due to the fineness of the lines, it is preferred that the paper be of a coated type that can receive clear and sharp images when the lines are printed on its surface.

2. The Conductive Elements

In the preferred practice of this invention, the conductive elements are attached to the substrate by printing as with rotogravure processes. While the width and spacing of the conductive elements are not particularly critical, it can be understood that the more lines that are laid down per unit of measure, the greater will be the fidelity of the image produced on the paper. For this reason, in order to obtain high fidelity, it may be useful to provide as many as 80 to 100 lines per inch.

Due to the large number of conductive lines per inch contemplated for use in the practice of this invention, it may be appreciated that the lines must be made of a very conductive material so that the resistance of the lines themselves does not cause sufficient heat to develop an erroneous color formation. To obtain this level of conductivity, the paper can be printed with an "ink" comprised of silver flake held in a suitable resinous binder such as, for example, nitrocellulose or an acrylic resin. In order to maintain the packing of the silver flakes at the highest possible level, it is important that the ratio of binder to silver not exceed the critical pigment volume concentration (CPVC). If the binder exceeds this volume, at least some of the silver particles will be separated from each other by the binder and, to this extent, the electrical resistance of the printed line will be increased. On the other hand, it is desirable that the conductive lines be stable films substantially free from voids and so the ratio of binder to silver should not be materially less than CPVC. (Note that as used herein and in the claims, reference to a ratio above or a ratio below the CPVC refer, respectively, to an excess or deficiency of binder with respect to the amount of binder that would be present at the CPVC.)

While silver flake is particularly desirable for use as the conductive material, other good electrical conductors in finely divided form, such as copper, gold, and the like, can be used.

3. The Resistive Film

As previously noted, in the preferred practice of this invention, a resistive film is coated over the first set of conductive elements and then a second set of intersecting conductive elements is printed on top of the resistive film. The resistive film may readily be applied to a continuous web of material carrying the first set of conductive elements as by flow coating and the thickness and uniformity of the film may be controlled by means of adjusting the viscosity of the coating solution, through the use of air knives or other means well known to the art.

The formulation of the resistive film presents special problems in that most film-forming resinous materials that conveniently can be used to form thin films act essentially as dielectric materials. Therefore, rather than conducting a current over a wide voltage range, the films remain nonconductive until such time as the imposed voltage exceeds their dielectric strength. When this point is reached, various changes may take place in the film which cause the electrical properties of the junction to become unstable or be permanently altered. Recording techniques in which the dielectric strength of a material interposed between the conductive elements of coincident current grids is modified so as to effect a permanent alteration of the electrical characteristics of said interposed material is covered in the U.S. Pat. application to Baumann et al. bearing U.S. Ser. No. 738,171 now abandoned and refiled as continuation-in-part application Ser. No. 796,455, and assigned to the assignee of the present invention. Such instability is not desirable in the practice of this invention and it is important that the film should be formulated so that its electrical properties will be maintained at substantially uniform levels during the period of time an e.m.f. is imposed at a given junction. For this and other reasons, it is preferred that the resistive film be a conductor that has a fixed ohmic resistance, in a useful range, that will enable the orderly development of a predictable amount of heat when a given voltage is imposed for a given period of time across a junction.

In order to obtain a resistive film having stable electrical properties for use in this invention, it has been found necessary to incorporate certain electrically resistive materials (more popularly known as semiconductor materials) in a resinous binder to provide conductive paths through the binder. These electrically resistive materials are utilized in the form of finely divided solids selected from materials having resistivities, for example, in the order of about $10^6$ to $10^8$ ohm-cm. Such materials include metal oxides and metal salts such as, for example, zinc oxide, cadmium sulfide, ferric oxide, cadmium oxide, vanadium oxide, titanium dioxide, and many others that can be found in an appropriate handbook.

In the above discussion regarding the formulation of conduction of conductive inks, it was noted that the CPVC should not be exceeded. The same applies with respect to the formulation of the resistive layer since it is desired that resistive particles comprising the electrically resistive material be tightly packed and essentially in touching relationship with each other. For practical purposes, due to the practical impossibility of achieving complete homogeneity, it is generally desired that the resistive film be formulated slightly below the CPVC so that there will be a slight deficiency of binder. It is important that this deficiency be quite modest for, if too little binder is used, the porosity in the film that results will permit penetration of the conductive inks when they are printed over the surface of the resistive film. If this occurs, the ohmic resistance of the resistive film will be seriously compromised and the entire network of conductive lines printed over the resistive film may be shorted out.

Even when carefully formulated in accordance with the foregoing, it has been observed that it is difficult to maintain uniform quality standards in production that will provide uniform and stable properties in the resistive film under imposed conditions of use. This is believed due to the fact that the mixing of the binder with resistive particles can never, from a practical standpoint, achieve complete homogeneity and, therefore, some separation between the resistive particles will result in an attendant discontinuity in electrically resistive paths. To avoid this difficulty, it has been discovered that conductive particles having a particle size substantially smaller, e.g., of a lesser order of magnitude, can usefully be included in the resistive film. When these small conductive particles are present in a proper amount, it would appear that they provide electrical paths between resistive particles that otherwise might be physically separated. This will help insure that coherent electrical paths are established through the cross section of the resistive film. It will be readily apparent, on the other hand, that the quantity of conductive particles that are added to the resistive film must be limited to a minor amount so that the conductive particles themselves will not present paths for the flow of electrical current across the film and materially decrease the ohmic resistivity of the resistive film. Stated somewhat differently, if the conductive particles are adjusted to be present in the proper amount, the ohmic resistance of the film will be essentially that of the resistive particles; if the quantity of conductive particles is too high, the ohmic resistance of the film will be essentially that of the conductive particles; and, if the quantity of the conductive particles is too low, the film may not be uniformly responsive to low potential electrical signals in the nature of those contemplated for use with the subject invention.

As will be discussed more fully with respect to the examples illustrating the preferred practice of this invention, the conductive particles the form of carbon black having a particle size of approximately 0.02 to 0.03 micron. These particles may be used in combination with resistive particles that have a preferred particle size ranging from about 0.2 to about 0.6 micron.

As an alternative to including conductive material such as carbon black in the resistive film, it is within the scope of this invention to prepare the resistive film using a conductive resin as the binder. In this instance, even though the resistive particles are slightly separated from each other by the binder, current can be conducted through the binder itself. This method of preparing the resistive film is somewhat less desirable since the presently available conductive resins are subject to considerable variations in conductivity, primarily depending upon their moisture content. For this reason, if conductive resins are used as the binder, it may be necessary to use the recording paper of this invention in environments of controlled humidity to obtain consistent results.

In the examples that follow, the materials that were used are identified as follows:

Zinc oxide - particle size of from about 0.2 to 0.6 micron, sold under the trade designation Hc-238-38 by New Jersey Zinc;

Carbon black - particle size of about 0.03 micron, sold under the trade designation XC-72 by Cabot;

Silver flake - particle size of about 7 to 10 microns, sold under the trade designation 0750SF by Alcan;

Acrylic resin - 40 percent solution of acrylic in VM and P naphtha, sold under the trade designation Acryloid B- 67 by Rohm & Haas;

Butadiene/styrene rubber - 30 percent solution of butadiene/styrene rubber in toluene, sold under the trade designation Plyolite S-7 by Goodyear;

Nitrocellulose solution - 35 percent solution of ½ second RS type nitrocellulose, obtained from Hercules, in ethyl acetate.

All proportions given in the following examples are in parts by weight.

EXAMPLE I

Two hundred parts of zinc oxide were mixed with the butadiene/styrene solution and an additional quantity of 200 parts toluene was added. On a dry weight basis, this was equivalent to 200 parts zinc oxide and 40.5 parts binder. As so formulated, the mixture was just very slightly below the CPVC.

A second mixture was prepared consisting of 30 parts carbon black, 180 parts of the rubber solution, and 313 parts toluene. On a dry weight basis, this was equivalent to 30 parts carbon black and 54 parts binder.

Ten parts of the zinc oxide mixture were mixed with 1 part of the carbon black mixture and ball milled overnight to obtain a homogenous mixture and reduce any agglomerates to a particle size less than the intended thickness of the resistive film which, in this instance, was to be about 0.3 mil.

A conductive ink was then prepared by adding 2 parts of the silver flake to 1 part of the nitrocellulose solution and 1 part toluene.

This conductive ink was printed, by means of a rotogravure process, onto a paper substrate. The lines were 1 mm. in width and were spaced 1 mm. apart. The approximate thickness of the lines was about 0.05 mil.

The paper substrate selected was a thermally sensitive reproduction paper sold under the trade designation Thermofax by the 3-M Company. The conductive lines were printed on the side of the paper opposite to the one bearing the thermally sensitive coating.

The conductivity of the printed lines was measured and it was found that each line averaged about 50 ohms per ½ inch.

The ball milled mixture was coated over the conductive lines with a wire-wound rod. The rod was selected to provide a coating about 0.3 mil thick.

The resistive coating was air dried and, to complete the structure of the recording paper, conductive lines formulated from inks as mentioned above were printed by rotogravure methods over the resistive film at right angles to the original conductive lines.

The structure of the final product so fabricated comprised a plurality of junctions having dimensions of 1 mm. × 1 mm. × 0.3 mil. The resistivity of these junctions was measured and found to average about 380 ohms ± 10 percent. When several of the pairs of conductive elements were connected to a 110 volt DC supply of current, a darkening of the paper (usually referred to herein and in the claims as a color formation) was immediately noted at the affected junctions.

EXAMPLE II

A conductive ink was prepared by mixing 2 parts of silver flake with 1 part of the acrylic resin solution and an additional 1 part of VM and P naphtha. The ink so prepared was found to be substantially the equivalent of the ink used in Example I.

EXAMPLE III

In Example I, the two series of resistive elements were separated only by the comparatively thin resistive film. To obtain somewhat better control over the resistive nature of the material separating the two series of conductive elements, a slightly different structure was found as follows.

A carbon black-filled conductive paper stock (obtained from Knowlton Brothers under the trade designation 506-L) was coated on both of its sides with the ball milled mixture of Example I. The coating was about 0.3 mil in thickness and was briefly dried in a convection oven. One set of conductive lines was printed on the resistive coating on one side of the paper and the other set of conductive lines was printed on the reverse side of the paper. It was found that due to the increased thickness of the composite structure separating the two sets of conductive elements, it was somewhat easier, for practical production purposes, to achieve uniformity in the electrical resistive properties of the resistive layer.

To complete the structure of this example, it is necessary to provide a heat-responsive color formation layer on top of at least one set of conductive elements. If both direct reading and mirror images are desired, both sets of conductive elements may be coated.

EXAMPLES IV—VIII

In the foregoing description of this invention, it was noted that the ratio of resistive particles to binder and the ratio of resistive particles to conductive particles was of considerable importance. In order to demonstrate this point, these Example IV—VIII are submitted to illustrate the effect on the conductive properties of the resistive film when the various quantities of ingredients are altered. These examples are based upon the zinc oxide, carbon black and rubber binder of Example I. While the principle upon which these examples are based is believed to have wide application, it should be noted that the ratios of various materials to obtain certain results has validity only with respect to the particular filler materials used and especially such properties as their critical PVC, their size, shape, surface characteristics, density, and the like. Therefore, while the exact ratios given here may vary in other systems, the principles remain the same and easily can be determined by anyone skilled in the art for any selected ingredients.

FIGS. 5—9 illustrate, in highly schematic form, the results that were obtained in Examples IV—VIII respectively, where the filler and binder content of the resistive coating layer were varied. In all of these figures, a cutaway portion of the resistive layer 14 is shown in which resistive particles 21 are held in a resinous binder 22. Additionally, in FIGS. 6 and 9, the resistive film 14 is shown to include finely divided conductive particles of carbon black 23.

Figure 5:
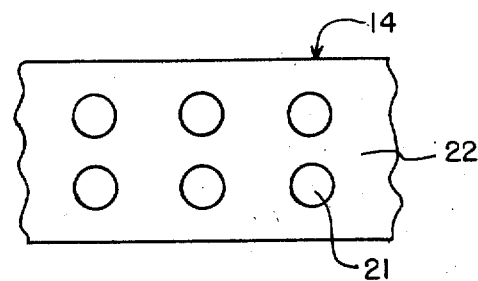
FIG. 5—9 are highly schematic drawings illustrating the resistive films of this invention at various conductive and resistive filler loadings.

Referring first to FIG. 5, the ratio of zinc oxide particles 21 to the rubber binder 22 was adjusted to be about 3:1 which is substantially above the CPVC. In this instance, it was found that the resistive film 14 responded, upon imposition of an e.m.f., as a dielectric material rather than as a resistive material. The reason for this, as can readily be observed from FIG. 5, lies in the fact that the separation between adjacent resistive particles 21 is too great and as a consequence no continuous paths for the conduction of a current exist.

Figure 6:
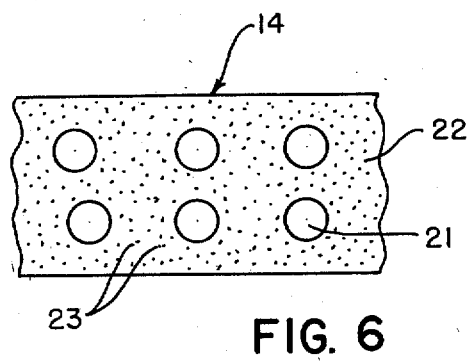

In the next example, as illustrated in FIG. 6, a considerable quantity of carbon black was added to the resistive film while maintaining the ratio of zinc oxide to binder at 3:1. It was thought that by these means, conductive paths would be set up between the zinc oxide particles to obtain the desired electrical properties. This experiment yielded a resistive film having an electrical resistance substantially equal to that of carbon black due to the fact that the great abundance of carbon black particles caused paths of current to be set up that bypassed the resistive particles and reduced the apparent resistance of the film to about that of the carbon black.

Figure 7:
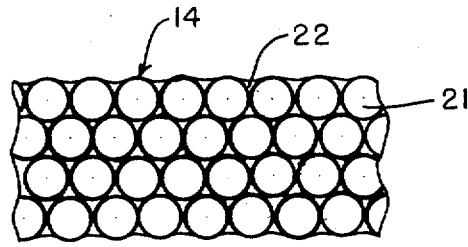

In a further attempt to obtain a satisfactory resistive film the amount of binder was decreased so that the ratio of zinc oxide particles to binder was about 5:1. The results of this are illustrated in FIG. 7. As here shown, an ideal situation results since all of the zinc oxide particles are in touching relationship to each other and the resistance of the film is essentially that of the zinc oxide. In other words, the ratio of binder to filler has been adjusted to, or just slightly below, the critical PVC and the void volume is filled with the binder without any excess, and, preferably, with a slight deficiency of binder. While such a structure provides the desired electrical properties, it is somewhat impractical to manufacture since it depends upon complete homogenety of the mixture of zinc oxide and binder. Thus, as a practical matter, a film of this sort generally contains areas with voids and other areas with excessive binder where the zinc oxide particles are not in touching relationship to each other.

Figure 8:
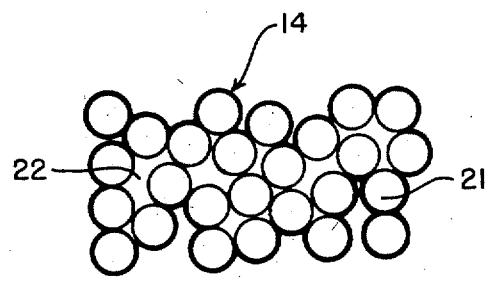

The amount of binder was next reduced to below the CPVC in order to determine if, by reducing the binder content, it could be insured that all of the zinc oxide particles would be in touching relationship to each other. As illustrated in FIG. 8, the ratio of zinc oxide to binder was adjusted to about 8:1. Upon measuring the electrical properties of this film, it was found to be quite satisfactory and free from any electrical instability at applied voltages. It was found, unfortunately, that this resistive film was actually not of utility since, when conductive silver lines were printed over its surface, the conductive ink penetrated the voids in the resistive film due to the insufficiency of binder and the conductive elements are substantially short circuited and its resistance reduced to 0.

Figure 9:
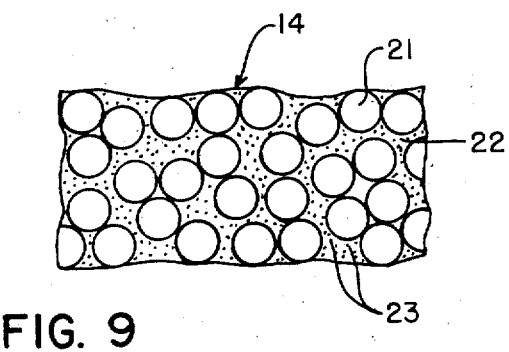

FIG. 9 illustrates a resistive film that was prepared in accordance with this invention having optimum properties. Here the ratio of zinc oxide to binder was adjusted to 5:1 to closely approximate the CPVC. However, unlike the example illustrated in FIG. 7, a small quantity of carbon black was included in the film. Thus, even though slight imperfections in the homogeneity in the mixture of zinc oxide and binder were present, the carbon black was present in sufficient quantities to provide conductive paths between adjacent but slightly separated particles of zinc oxide. Since the path of current was substantially through the zinc oxide particles, the resistance of the film was found to be closely approximate that of the zinc oxide particles.

From the foregoing discussion and examples, it is believed that anyone skilled in the art will be able to formulate a suitable resistive film in accordance with this invention. To summarize, the film must contain a resistive material held in a binder and, in theory, if the ratio of these ingredients is adjusted to be close to or slightly below the CPVC, satisfactory results may be obtained. However, from a practical standpoint, it is preferable to include a quantity of highly conductive, extremely finely divided particles in an amount just sufficient to provide conductivity between adjacent particles of resistive material should they be slightly separated due to imperfect mixing.

We claim:

1. A unitary device for recording intelligence in selected visual patterns comprised of:
   a substrate;
   a first and a second series of extended conductive elements located in first and second planes respectively associated with and parallel to the principal plane of the substrate which, when viewed normal to the plane of the substrate, intersect in a plurality of programmed junctions;
   a continuous electrically resistive layer comprised of a resinous binder, finely divided particles of an electrically resistive material, and a minor portion of highly conductive solids that are substantially smaller than the resistive materials.

2. A device according to claim 1 wherein the conductive solids are an order of magnitude smaller than the resistive materials.

3. A device according to claim 2 wherein the conductive solids are carbon black and have a particle size of about 0.03 micron.

4. A device according to claim 2 wherein the resistive materials have a size of between about 0.1 and about 1.0 micron.

5. A device according to claim 4 wherein the ratio of the resistive materials to the conductive solids exceeds 50:1 by weight.